US009823456B2

United States Patent
Kondo et al.

(10) Patent No.: US 9,823,456 B2
(45) Date of Patent: Nov. 21, 2017

(54) LASER SCANNING MICROSCOPE

(71) Applicant: OLYMPUS CORPORATION, Hachioji-shi, Tokyo (JP)

(72) Inventors: Kanako Kondo, Tokyo (JP); Makio Ueno, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/098,092

(22) Filed: Apr. 13, 2016

(65) Prior Publication Data

US 2016/0313545 A1    Oct. 27, 2016

(30) Foreign Application Priority Data

Apr. 27, 2015    (JP) ................. 2015-090366

(51) Int. Cl.
G02B 26/08    (2006.01)
G02B 21/00    (2006.01)
G02B 21/08    (2006.01)
G02B 26/10    (2006.01)

(52) U.S. Cl.
CPC ..... *G02B 21/0048* (2013.01); *G02B 21/0032* (2013.01); *G02B 21/0076* (2013.01); *G02B 21/08* (2013.01); *G02B 26/101* (2013.01); *G02B 26/105* (2013.01)

(58) Field of Classification Search
CPC G02B 21/0048; G02B 21/0032; G02B 21/08; G02B 26/105; G02B 26/101; G02B 21/0076; G02B 21/242; G02B 7/08
USPC ..................... 359/368, 383, 215.1
See application file for complete search history.

(56) References Cited

U.S. PATENT DOCUMENTS

2006/0103922 A1*    5/2006    Tsuyuki ............... G02B 21/242
                                                           359/383
2009/0073553 A1    3/2009    Hirata

FOREIGN PATENT DOCUMENTS

JP    2009069689 A    4/2009

* cited by examiner

*Primary Examiner* — Euncha Cherry
(74) *Attorney, Agent, or Firm* — Holtz, Holtz & Volek PC

(57) ABSTRACT

In order to allow precise observation of a specimen at an observation point with a desired depth without changing the working distance of an objective optical system while employing a simple configuration, a laser scanning microscope according to the present invention includes an objective lens having a plurality of optical elements that are disposed with gaps therebetween in an optical-axis direction and that condense laser light emitted from a light source onto a specimen and also having an adjustment ring that allows changing of the focal point by moving the optical elements in the optical-axis direction; a scanner that has a galvanometer mirror capable of oscillating about a predetermined oscillation axis and that scans the laser light condensed onto the specimen by the objective lens in accordance with an oscillation angle of the galvanometer mirror; a light detecting unit that obtains image information of the specimen on the basis of return light returned from the specimen scanned with the laser light; and a scanner controlling unit that controls the oscillation angle of the galvanometer mirror so as to maintain an observation range of the specimen observed by the light detecting unit on the basis of the positions of the optical elements moved by the adjustment ring.

11 Claims, 10 Drawing Sheets

<LINEAR INTERPOLATION>

<CURVE INTERPOLATION>

LASER SCANNING MICROSCOPE

CROSS-REFERENCE TO RELATED APPLICATIONS

This application is based on Japanese Patent Application No. 2015-090366, the contents of which are incorporated herein by reference.

TECHNICAL FIELD

The present invention relates to laser scanning microscopes.

BACKGROUND ART

In the related art, light scanning microscopes of the type having a stick-type objective lens that enables the observation of a deep point inside a specimen, such as a living animal, when being stuck in the specimen (e.g., see Patent Literature 1) are known. A light scanning microscope described in Patent Literature 1 includes a focus adjusting unit disposed between a stick objective lens and an image forming lens that forms an image with light collected by the stick objective lens. Furthermore, it is possible to change the focal point without moving the stick objective lens itself by relatively moving two lens groups constituting the focus adjusting unit in the optical-axis direction, while changing the magnification of projection from the scanning unit to the stick objective lens to correct the observation range that would otherwise change with the movement of the lens groups in the focus adjustment unit.

CITATION LIST

Patent Literature

{PTL 1}
Japanese Unexamined Patent Application, Publication No. 2009-69689

SUMMARY OF INVENTION

Technical Problem

With the method of changing the projection magnification by moving the lens groups of the focus adjustment unit in the optical-axis direction, as in the light scanning microscope described in Patent Literature 1, it is not possible to correct the changed observation range with high precision. Furthermore, with the light scanning microscope described in Patent Literature 1, the group velocity delay dispersion of the microscope as a whole increases due to the addition of the focus adjustment unit, and thus the excitation efficiency at the time of observation with multi-photon excitation decreases.

The present invention provides a laser scanning microscope that enables, with a simple configuration, precise observation of a specimen at an observation point with a desired depth without changing the working distance of an objective optical system.

An aspect of the present invention is a laser scanning microscope including an objective optical system including a plurality of optical elements that are disposed with gaps therebetween in an optical-axis direction and that condense laser light emitted from a light source onto a specimen and also including a focal-point changing unit that allows changing of the focal point by moving some of the plurality of optical elements in the optical-axis direction; a scanning unit that includes an oscillating mirror capable of oscillating about a predetermined oscillation axis and that scans the laser light condensed onto the specimen by the objective optical system in accordance with an oscillation angle of the oscillating mirror; an observation optical system that obtains image information of the specimen on the basis of return light returned from the specimen scanned by the scanning unit with the laser light; and an oscillating-mirror controlling unit that controls the oscillation angle of the oscillating mirror so as to maintain an observation range of the specimen observed by the observation optical system on the basis of the positions of the optical elements moved by the focal-point changing unit.

According to this aspect, the laser light emitted from the light source is scanned by the scanning unit in accordance with the oscillation angle of the oscillating mirror and is condensed at the specimen via the plurality of optical elements of the objective optical system, and the observation optical system obtains image information of the observation range of the specimen on the basis of return light returned from the specimen. Furthermore, in the objective optical system, the focal-point changing unit moves the optical elements in the optical-axis direction. This makes it possible to change the focal point without moving the objective optical system itself relative to the specimen, thereby changing the observation point in the specimen in the depth direction.

In this case, since the observation range of the specimen observed by the observation optical system changes depending on the positions of the plurality of optical elements of the objective optical system and the scanning range of the laser light, even in the case where the oscillating-mirror controlling unit controls the oscillation angle of the oscillating mirror so as to maintain the observation range of the specimen observed by the observation optical system on the basis of the positions of the optical elements of the objective optical system moved by the focal-point changing unit, whereby the positions of the optical elements of the objective optical system are changed and the focal point is changed, it is possible to prevent variations in the observation range of the specimen observed by the observation optical system.

Furthermore, by maintaining the observation range of the specimen observed by the operation of the scanning unit, which is usually provided in a laser scanning microscope, compared with the case where a special mechanism for maintaining the observation range is adopted separately, the group velocity delay dispersion of the microscope as a whole is not increased, and thus a reduction in the excitation efficiency is prevented.

Accordingly, with the simple configuration in which just the oscillating mirror of the scanning unit is controlled, it is possible to precisely observe the specimen at an observation point with a desired depth without changing the working distance of the objective optical system.

In the above aspect, the oscillating-mirror controlling unit may adjust an oscillation width of the oscillating mirror.

When the positions of the optical elements of the objective optical system in the optical-axis direction are changed, the size of the observation range of the specimen observed by the observation optical system changes. Since the size of the scanning range of the laser light changes when the oscillation width of the oscillating mirror is changed, with this configuration, it is possible to prevent variations in the size of the observation range of the observation optical system even when the positions of the optical elements of the objective optical system are changed in the optical-axis direction.

In the above aspect, the oscillating-mirror controlling unit may adjust the direction of the center of an oscillation range of the oscillating mirror.

When the optical elements of the objective optical system are moved in the optical-axis direction, there are cases where the optical elements become deviated from the center, whereby the position of the observation range of the specimen observed by the observation optical system deviates in a direction intersecting the optical axis. Since the position of the scanning range of the laser light moves in the direction intersecting the optical axis when the direction of the center of the oscillation range of the oscillating mirror is changed, with this configuration, it is possible to prevent lateral deviation of the position of the observation range of the observation optical system even when the optical elements of the objective optical system become deviated from the center.

In the above aspect, the focal-point changing unit may allow the optical elements to be moved in the optical-axis direction multiple times in a stepwise fashion.

With this configuration, by moving the optical elements of the objective optical system in the optical-axis direction multiple times in a stepwise fashion, it is possible to sequentially change the focal point and to observe the specimen along the depth direction. In this case, since the oscillating-mirror controlling unit controls the oscillation angle of the oscillating mirror so as to maintain the observation range of the specimen observed by the observation optical system each time the positions of the optical elements of the objective optical system are changed, it is possible to observe the specimen three-dimensionally in a constant observation range.

In the above aspect, the oscillating-mirror controlling unit may control the oscillation angle of the oscillating mirror on the basis of an oscillation-angle correcting value indicating a relationship between the positions of the optical elements and the oscillation angle of the oscillating mirror with which the observation range becomes a predetermined range.

With this configuration, it is possible to readily prevent variations in the observation range of the specimen observed by the observation optical system due to movement of the optical elements, on the basis of the oscillation-angle correcting value associated with the moved positions of the optical elements.

In the above aspect, the laser scanning microscope may further include a position detecting unit that detects the positions of the optical elements moved by the focal-point changing unit, the focal-point changing unit may be configured to allow a user to manually move the optical elements in the optical-axis direction, and the oscillating-mirror controlling unit may control the oscillation angle of the oscillating mirror on the basis of the oscillation-angle correcting value associated with the positions of the optical elements detected by the position detecting unit.

With this configuration, when the user manually moves the optical elements of the objective optical system in the optical-axis direction via the focal-point changing unit, on the basis of the oscillation-angle correcting value associated with the moved positions of the optical elements detected by the position detecting unit, the oscillating-mirror controlling unit controls the oscillation angle of the oscillation mirror so as to maintain the observation range of the observation optical system. This enables precise observation at the observation point with the desired depth manually changed by the user.

In the above aspect, the laser scanning microscope may further include an input unit that allows the user to input position information indicating the positions of the optical elements of the objective optical system; and a focal-point controlling unit that controls the focal-point changing unit so that the objective optical system comes to the positions of the optical elements indicated by the position information input via the input unit, and the oscillating-mirror controlling unit may control the oscillation angle of the oscillating mirror on the basis of the oscillation-angle correcting unit corresponding to the positions of the optical elements indicated by the position information input via the input unit.

With this configuration, when the user inputs desired position information of the optical elements of the objective optical system via the input unit, the focal-point controlling unit moves the optical elements of the objective optical system to change the focal point, and the oscillating-mirror controlling unit controls the oscillation angle of the oscillating mirror so as to maintain the observation range of the specimen observed by the observation optical system. Accordingly, it is possible to automatically change the observation depth in the specimen and precisely observe an observation point with a desired depth with a simple operation.

In the above aspect, the laser scanning microscope may further include the light source, the light source being capable of changing the wavelength of the laser light that is generated, and the oscillating-mirror controlling unit may control the oscillation angle of the oscillating mirror so as to maintain the observation range of the specimen observed by the observation optical system on the basis of the wavelength of the laser light emitted from the light source.

When the wavelength of the laser light for irradiating the specimen is changed, the chromatic aberration of magnification varies depending on the wavelength, and thus the observation range of the specimen observed by the observation optical system varies. However, since the oscillating-mirror controlling unit controls the oscillation angle of the oscillating mirror so as to maintain the observation range of the specimen observed by the observation optical system on the basis of the changed wavelength of the laser light, it is possible to prevent variations in the observation range of the observation optical system even in the case where the wavelength of the laser light is changed.

In the above aspect, the oscillation-angle correcting value may also indicate a relationship between the wavelength of the laser light and the oscillation angle of the oscillating mirror with which the observation range becomes a predetermined range, and the oscillating-mirror controlling unit may control the oscillation angle of the oscillating mirror on the basis of the oscillation-angle correcting value corresponding to the changed wavelength of the laser light.

With this configuration, it is possible to readily prevent variations in the observation range of the specimen observed by the observation optical system due to the change in the laser light wavelength, on the basis of the oscillation-angle correcting value associated with the changed wavelength of the laser light.

In the above aspect, the laser scanning microscope may further include an in-focus-state controlling unit that controls the focal-point changing unit so as to maintain an in-focus state in the optical-axis direction of the objective optical system on the basis of the wavelength of the laser light emitted from the light source.

When the wavelength of the laser light for irradiating the specimen is changed, the focal point moves due to the effect of chromatic aberration. With this configuration, however, even in the case where the wavelength of the laser light is changed, it is possible to maintain an in-focus state by the operation of the in-focus-state controlling unit, which enables precise observation at the observation point of the specimen with a desired wavelength.

In the above aspect, the in-focus-state controlling unit may control the focal-point changing unit on the basis of a focus correcting value indicating a relationship between the wavelength of the laser light and the positions of the plurality of optical elements with which the laser light becomes focused in the optical-axis direction of the objective optical system.

With this configuration, it is possible to readily prevent variations in the focal point due to the change in the wavelength of the laser light on the basis of the focus correcting value associated with the changed wavelength.

According to the present invention, an advantage is afforded in that it is possible, with a simple configuration, to precisely observe a specimen at an observation point with a desired depth without changing the working distance of the objective optical system.

DESCRIPTION OF EMBODIMENTS

[First Embodiment]

A laser scanning microscope according to a first embodiment of the present invention will be described below with reference to the drawings.

Figure 1:
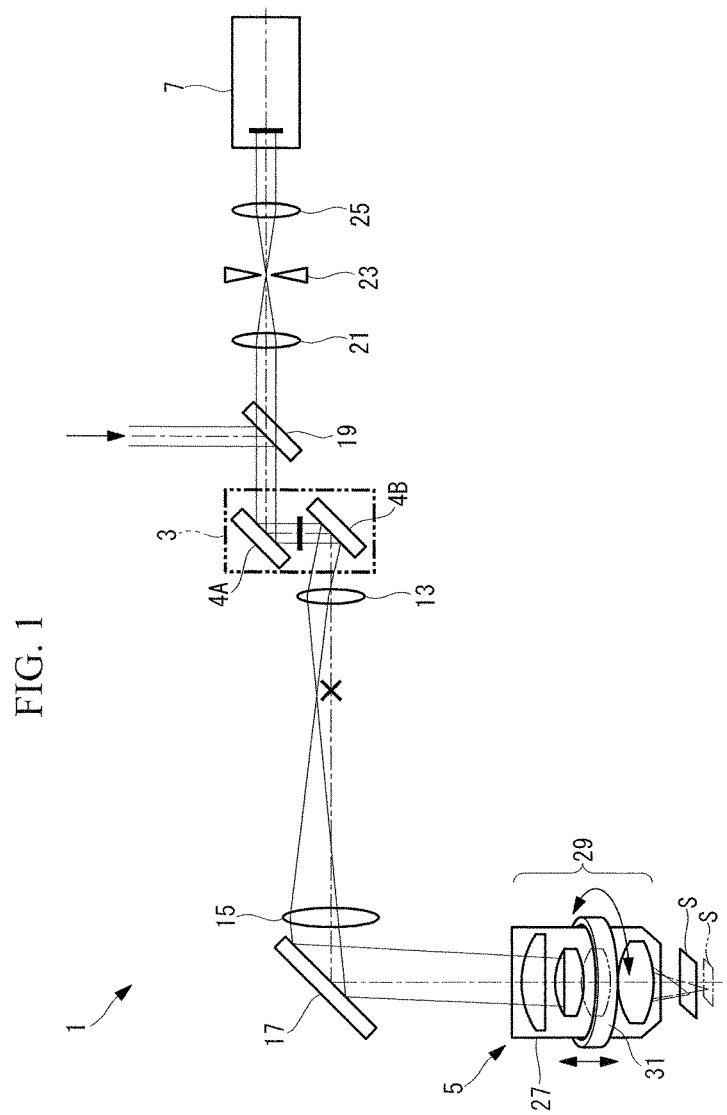
FIG. 1 is a schematic illustration showing the configuration of a laser scanning microscope according to a first embodiment of the present invention.
Figure 2:
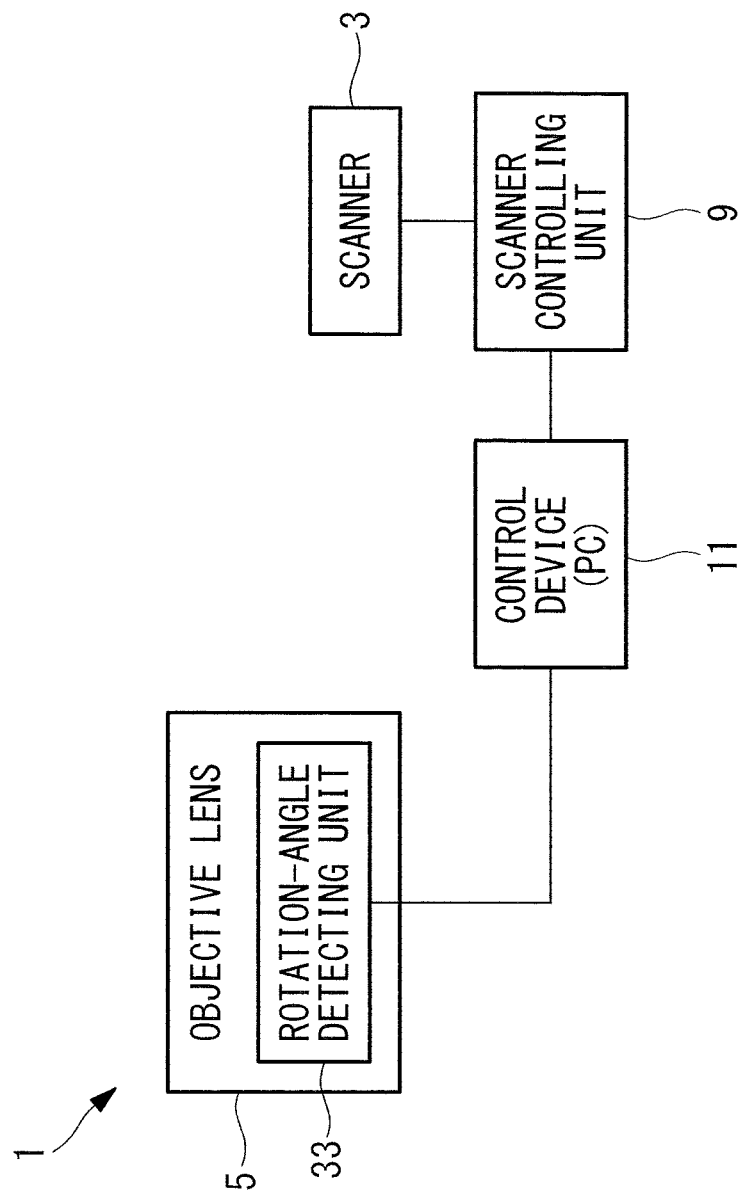
FIG. 2 is a block diagram showing a control device, etc. of the laser scanning microscope according to the first embodiment of the present invention.

As shown in FIGS. 1 and 2, a laser scanning microscope 1 according to this embodiment includes a light source, which is not shown; a scanner (scanning unit) 3 that two-dimensionally scans laser light emitted from the light source; an inner-focus objective lens (objective optical system, hereinafter simply referred to as "objective lens") 5 that irradiates a specimen S with the laser light scanned by the scanner 3 and that collects fluorescence (return light) emitted from the specimen S; a light detector (observation optical system) 7, such as a photomultiplier tube, that obtains image information of the specimen S on the basis of the fluorescence emitted from the specimen S scanned with the laser light by the scanner 3; a scanner controlling unit (oscillating-mirror controlling unit) 9 that controls the scanner 3; and a control device 11, such as a personal computer (PC), that performs overall control of the laser scanning microscope 1 and that generates images.

Furthermore, as shown in FIGS. 1 and 2, the laser scanning microscope 1 includes a pupil projection lens 13 that condenses the laser light scanned by the scanner 3; an image-forming lens 15 that substantially collimates the laser light condensed by the pupil projection lens 13; a reflection mirror 17 that reflects the laser light substantially collimated by the image-forming lens 15 toward the objective lens 5; a dichroic mirror 19 that splits off the fluorescence from the specimen S, collected by the objective lens 5 and returning along the light path of the laser light, from the light path of the laser light; a confocal lens 21 that condenses the fluorescence split off by the dichroic mirror 19; a confocal pinhole 23 that passes only the fluorescence generated at the focal point of the objective lens 5 in the specimen S from among the fluorescence condensed by the confocal lens 21; and a collimating lens 25 that substantially collimates the fluorescence passed through the confocal pinhole 23.

The scanner 3 is, for example, a proximity-galvanometer-mirror scanner; that is, the scanner 3 includes a pair of galvanometer mirrors (oscillating mirrors) 4A and 4B that can oscillate about mutually intersecting oscillation axes. The scanner 3 is disposed such that the position of the midpoint of the pair of galvanometer mirrors 4A and 4B and the pupil position of the objective lens 5 are conjugate with each other. Furthermore, the scanner 3 is configured such that laser light can be scanned in orthogonal X and Y directions in accordance with the oscillation angles of the individual galvanometer mirrors 4A and 4B.

As shown in FIGS. 1 and 2, the objective lens 5 includes a long, thin, substantially hollow, cylindrical casing 27; a plurality of optical elements 29 that are accommodated inside the casing 27 and that focuses the laser light from the reflection mirror 17 at the specimen S and collects the fluorescence from the specimen S; an adjustment ring (focal-point changing unit) 31 that is provided rotatably about the center axis of the casing 27 and that allows changing of the positions of the plurality of optical elements 29 along the optical-axis direction; and a rotation-angle detecting unit (position detecting unit) 33 that detects, as needed, the rotation angle of the adjustment ring 31 about the center axis thereof.

The casing 27 has a stair-like shape such that the thickness thereof decreases stepwise from the proximal end to the distal end, which allows the thin distal-end portion at the distal end to be inserted into the specimen S with little invasiveness.

The plurality of optical elements 29 are arrayed along the lengthwise direction of the casing 27 with gaps therebetween in the optical-axis direction and are individually movable in the optical-axis direction.

The adjustment ring 31 is disposed so as to be fitted on the outer circumference of the casing 27 and is configured so as to be manually rotatable by a user in the circumferential direction. By being rotated in the circumferential direction, the adjustment ring 31 allows some of the plurality of optical elements 29 to be moved in the optical-axis direction inside the casing 27, thereby changing the focal point.

The rotation-angle detecting unit 33 makes it possible to detect the positions of the optical elements 29 by detecting the rotation angle of the adjustment ring 31. The rotation-angle detecting unit 33 is configured to convert the detected rotation angle of the adjustment ring 31 into an electrical signal and to send rotation-angle information indicating the rotation angle of the adjustment ring 31 to the control device 11.

The dichroic mirror 19 reflects the laser light from the light source toward the scanner 3 and transmits the fluorescence coming from the specimen S via the objective lens 5 and descanned by the scanner 3 toward the confocal lens 21.

The confocal pinhole 23 is disposed at a position that is conjugate with the pupil position of the objective lens 5.

The light detecting unit 7 sends the obtained image information to the control device 11.

The laser scanning microscope 1 is configured to generate an image of the specimen S on the basis of scanning-position information regarding the scanning position of the laser light and the image information sent from the light detecting unit 7. Furthermore, the control device 11 is configured to control the oscillation angles of the galvanometer mirrors 4A and 4B so as to maintain the observation range of the specimen S observed by the light detecting unit 7 on the basis of the positions of the optical elements 29 in the case where the optical elements 29 are moved in the optical-axis direction by the adjustment ring 31.

Specifically, the control device 11 stores oscillation-angle correcting values indicating the relationships between the rotation angles of the adjustment ring 31 (the positions of the optical elements 29) and the oscillation angles of the galvanometer mirrors 4A and 4B, with which the observation range becomes a predetermined range, and is configured to instruct the scanner controlling unit 9 to adjust the oscillation angles of the galvanometer mirrors 4A and 4B on the basis of the oscillation-angle correcting values associated with the rotation angle of the adjustment ring 31 indicated by the rotation-angle information sent from the rotation-angle detecting unit 33.

As the oscillation-angle correcting values, a correcting value G (Gain) indicating the relationship between the rotation angle $\theta$ of the adjustment ring 31 corresponding to the positions of the optical elements 29 and the oscillation widths of the galvanometer mirrors 4A and 4B, and a correcting value O (Offset) indicating the relationship between the rotation angle $\theta$ of the adjustment ring 31 corresponding to the positions of the optical elements 29 and the directions of the centers of the oscillation ranges of the galvanometer mirrors 4A and 4B are used. For example, the control device 11 stores correcting values Gn and correcting values On individually measured in advance continuously in association with the rotation angles $\theta n$ of the adjustment ring 31, and the control device 11 is configured to read the correcting value Gn and correcting value On associated with the rotation angle $\theta n$ of the adjustment ring 31 and to set the correcting value Gn and correcting value On to the scanner controlling unit 9.

The scanner controlling unit 9 is configured to adjust the oscillation widths of the galvanometer mirrors 4A and 4B on the basis of the correcting value Gn set by the control device 11 and to adjust the directions of the centers of the oscillation ranges of the galvanometer mirrors 4A and 4B on the basis of the correcting value On so that the galvanometer mirrors 4A and 4B will oscillate accordingly. Furthermore, the scanner controlling unit 9 is configured to send scanning position information regarding the scanning position of the laser light corresponding to the oscillation angles of the galvanometer mirrors 4A and 4B to the control device 11.

The scanner controlling unit 9 may be implemented by any combination of software and hardware components. For example, the scanner controlling unit 9 may be formed of a current-drive circuit that causes the galvanometer mirrors 4A and 4B of the scanner 3 to oscillate, a memory such as a RAM for storing the correcting values Gn and correcting values On that are set by the controlling device 11, an interface circuit that carries out communication with the control device 11, a processor, etc. (none of these are shown). Alternatively, the scanner controlling unit 9 may be a computer that operates as a scanner controlling unit according to a scanner controlling program.

Now, the operation of the thus-configured laser scanning microscope 1 will be described.

In order to observe the specimen S with the laser scanning microscope 1 according to this embodiment, the thin distal-end portion of the objective lens 5 is inserted into the specimen S placed on a stage, etc., which is not shown, and after the position of the distal-end portion is fixed, laser light is generated from the light source while the galvanometer mirrors 4A and 4B of the scanner 3 are oscillated by the scanner controlling unit 9.

The laser light emitted from the light source is reflected by the dichroic mirror 19 and is then scanned by the scanner 3. The laser light scanned by the scanner 3 is condensed by the pupil projection lens 13, is then substantially collimated by the image-forming lens 15, is then reflected by the reflection mirror 17, and then irradiates the specimen S via the objective lens 5. Thus, the specimen S is scanned two-dimensionally with the laser light in accordance with the oscillation angles of the galvanometer mirrors 4A and 4B in the scanner 3.

The fluorescence generated at the specimen S scanned with the laser light is collected by the objective lens 5, returns along the light path of the laser light, is descanned by the scanner 3 via the reflection mirror 17, the image-forming lens 15, and the pupil projection lens 13, and is transmitted through the dichroic mirror 19 and is split off from the light path of the laser light.

The fluorescence transmitted through the dichroic mirror 19 is condensed by the confocal lens 21, and only the fluorescence generated at the focal point of the objective lens 5 in the specimen S passes through the confocal pinhole 23. The fluorescence that passes through the confocal pinhole 23 is substantially collimated by the collimating lens 25 and is then detected by the light detecting unit 7. Then, the light detecting unit 7 obtains image information of the specimen S on the basis of the detected fluorescence, and the control device 11 generates an image of the specimen S on the basis of the image information and the scanning position information of the laser light.

Here, a user can change the focal point and adjust the observation point in the specimen S in the depth direction by rotating the adjustment ring 31 of the objective lens 5 to move some of the plurality of optical elements 29 in the optical-axis direction. By changing the focal point by changing the positions of the optical elements 29, it is possible to change the observation point in the depth direction of the specimen S without changing the objective lens 5 whose position has been fixed in relation to the specimen S.

Figure 3:
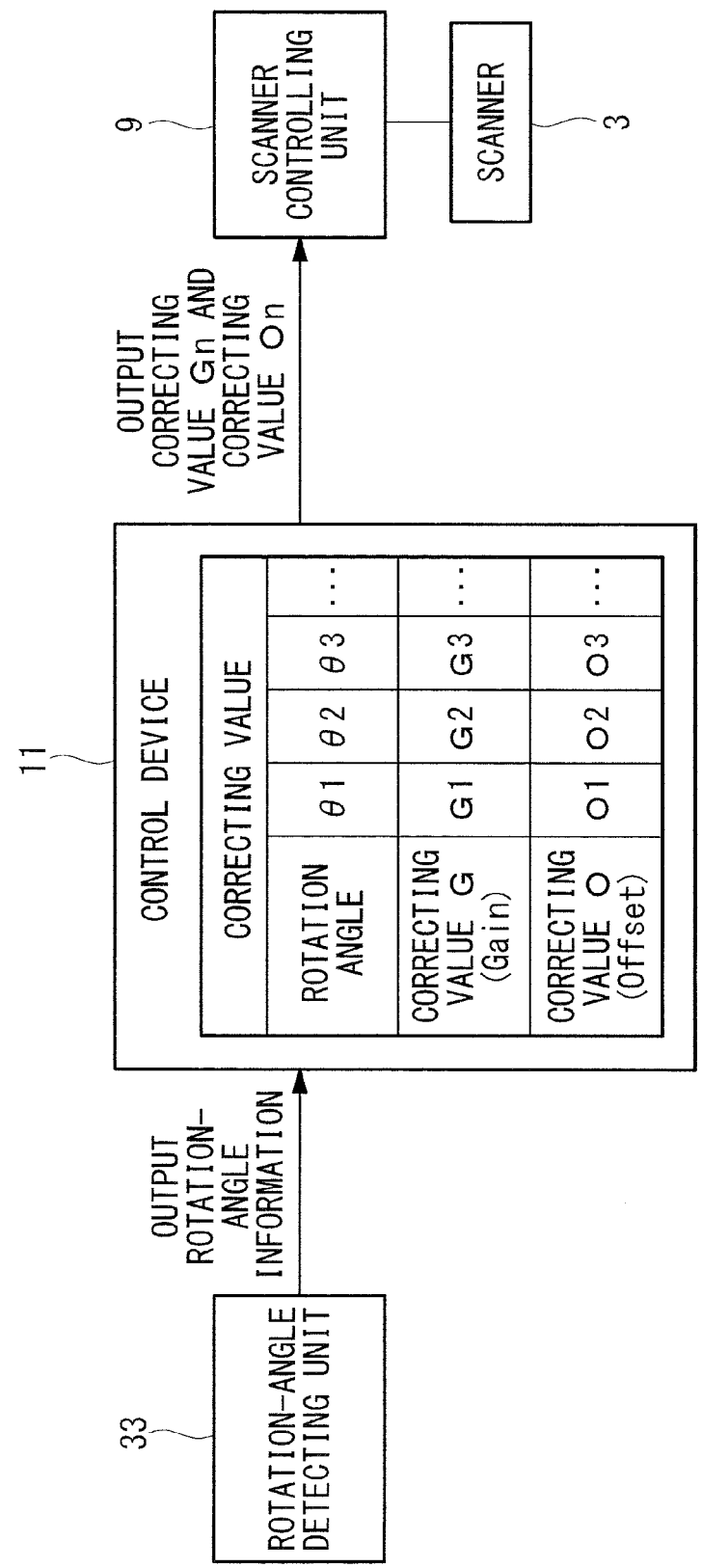
FIG. 3 is a block diagram for explaining the relationship among a rotation-angle detecting unit, the control device, and a scanner controlling unit.

In this case, when the optical elements 29 are moved in the optical-axis direction, as shown in FIG. 3, the rotation-angle detecting unit 33 detects the rotation angle θ of the adjustment ring 31 and sends rotation-angle information indicating the rotation angle θ to the control device 11. Then, the control device 11 sets the correcting value Gn and correcting value On associated with the rotation angle θn of the adjustment ring 31 indicated by the rotation-angle information in the scanner controlling unit 9.

Then, on the basis of the correcting value Gn and correcting value On that have been set, the scanner controlling unit 9 adjusts the oscillation widths and the directions of the centers of the oscillation ranges of the galvanometer mirrors 4A and 4B so that the galvanometer mirrors 4A and 4B will oscillate accordingly.

For example, when the positions of the optical elements 29 in the optical-axis direction are changed in the objective lens 5, the size of the observation range of the specimen S observed by the light detecting unit 7 changes. Since the size of the scanning range of the laser light is changed by changing the oscillation widths of the galvanometer mirrors 4A and 4B, it is possible to maintain the size of the observation range of the light detecting unit 7 by adjusting the size of the scanning range of the laser light on the basis of the correcting value Gn associated with the moved positions of the optical elements 29 along the optical-axis direction.

Also, when the optical elements 29 of the objective lens 5 are moved in the optical-axis direction, there are cases where the optical elements 29 deviate from the center, whereby the observation range of the specimen S observed by the light detecting unit 7 deviates in a direction intersecting the optical axis. Since the position of the scanning range of the laser light moves in the direction intersecting the optical axis by changing the directions of the centers of the oscillation ranges of the galvanometer mirrors 4A and 4B, it is possible to maintain the position of the observation range of the light detecting unit 7 by adjusting the position of the scanning range of the laser light in the direction intersecting the optical axis on the basis of the correcting value On associated with the moved positions of the optical elements 29.

Accordingly, it is possible to change the observation point in the depth direction in observing the specimen S, while maintaining the size and position of the observation range of the specimen S observed by the light detecting unit 7.

As described above, with the laser scanning microscope 1 according to this embodiment, even in the case where the focal position is changed by moving the optical elements 29 of the objective lens 5, it is possible to prevent variations in the observation range of the specimen S observed by the light detecting unit 7. Furthermore, by maintaining the observation range of the light detecting unit 7 by the operation of the scanner 3, which is usually provided in a laser scanning microscope, compared with the case where a special mechanism for maintaining the observation range is adopted separately, the group velocity delay dispersion of the microscope as a whole is not increased, and thus a reduction in the excitation efficiency is prevented. Accordingly, with the simple configuration in which the galvanometer mirrors 4A and 4B of the scanner 3 are controlled, it is possible to precisely observe the specimen S at an observation point in a desired depth without changing the working distance of the objective lens 5.

[Second Embodiment]

Next, a laser scanning microscope according to a second embodiment of the present invention will be described with reference to the drawings.

Figure 4:
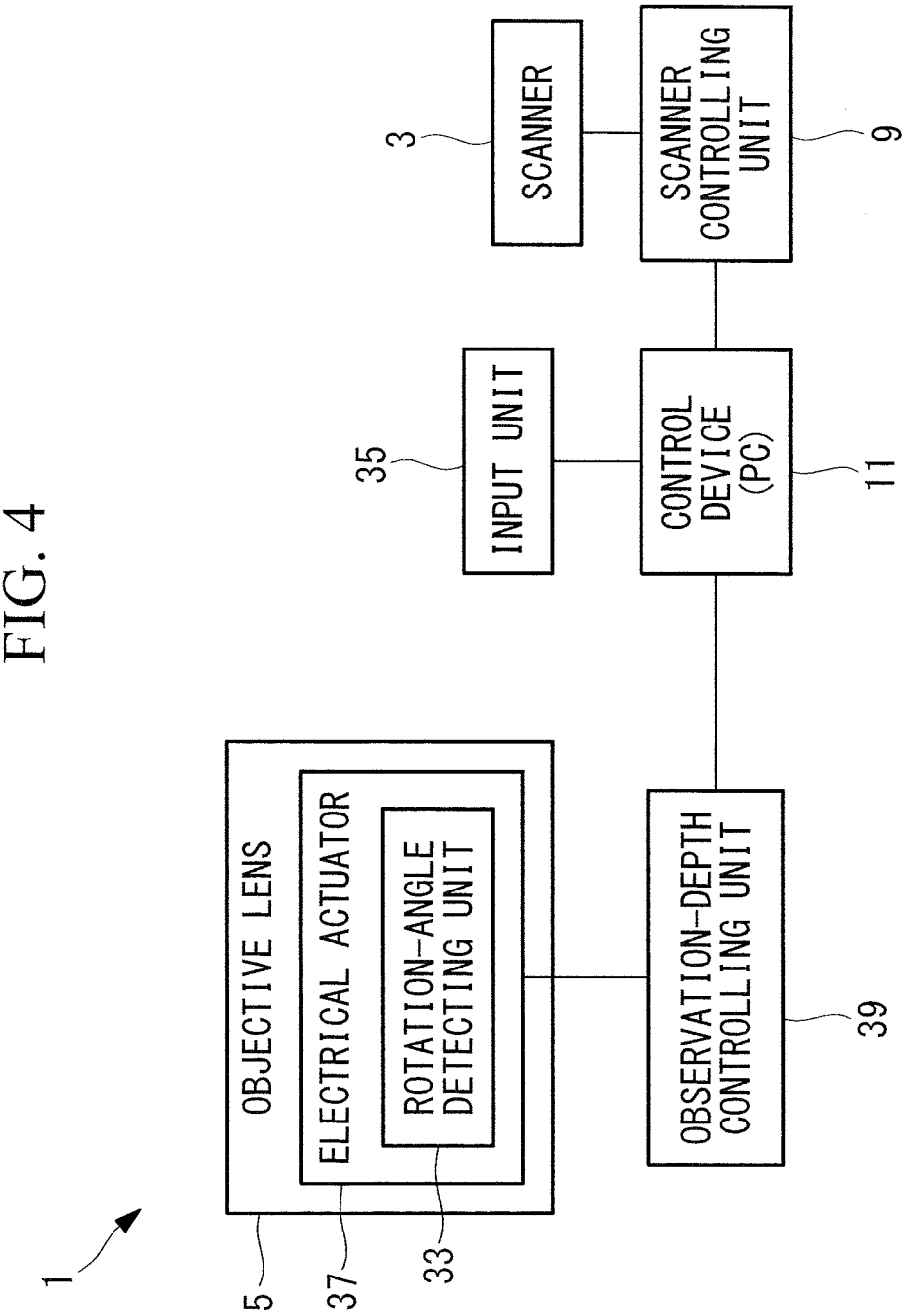
FIG. 4 is a block diagram showing a control device, etc. of a laser scanning microscope according to a second embodiment of the present invention.

As shown in FIG. 4, a laser scanning microscope 1 according to this embodiment differs from that of the first embodiment in that the control device (focal-point controlling unit) 11 automatically moves some of the plurality of optical elements 29 to change the focal point.

Hereinafter, parts that are configured the same as those in the laser scanning microscope 1 according to the first embodiment will be designated by the same reference signs, and descriptions thereof will be omitted.

As shown in FIG. 4, the laser scanning microscope 1 according to this embodiment includes an input unit 35 that allows a user to input observation-depth information (position information) indicating an observation depth in the specimen S corresponding to the positions of the optical elements 29 of the objective lens 5; an electrical actuator 37 that rotates the adjustment ring 31 in the circumferential direction; and an observation-depth controlling unit 39 that drives the electrical actuator 37.

The input unit 35 is, for example, a mouse or a keyboard. The input unit 35 is configured to send the observation-depth information input by the user to the control device 11.

The control device 11 has software for converting the observation depth in the specimen S, indicated by the observation-depth information sent from the input unit 35, into rotation-angle information indicating a rotation angle of the adjustment ring 31. The control device 11 is configured to set the correcting value G and correcting value O corresponding to the rotation angle θ of the adjustment ring 31 in the scanner controlling unit 9 and to convert the rotation-angle information obtained by the conversion by the software into a number of pulses and set the number of pulses in the observation-depth controlling unit 39.

The observation-depth controlling unit 39 is configured to drive the electrical actuator 37 so that the adjustment ring 31 is rotated in the circumferential direction on the basis of the rotation angle θ of the adjustment ring 31, indicated by the rotation-angle information set by the control device 11, whereby the optical elements 29 are moved in the optical-axis direction.

Now, the operation of the thus-configured laser scanning microscope 1 will be described.

In the case where the specimen S is observed with the laser scanning microscope 1 according to this embodiment, a user inputs, via the input unit 35, observation-depth information indicating a desired observation depth in the specimen S.

Figure 5:
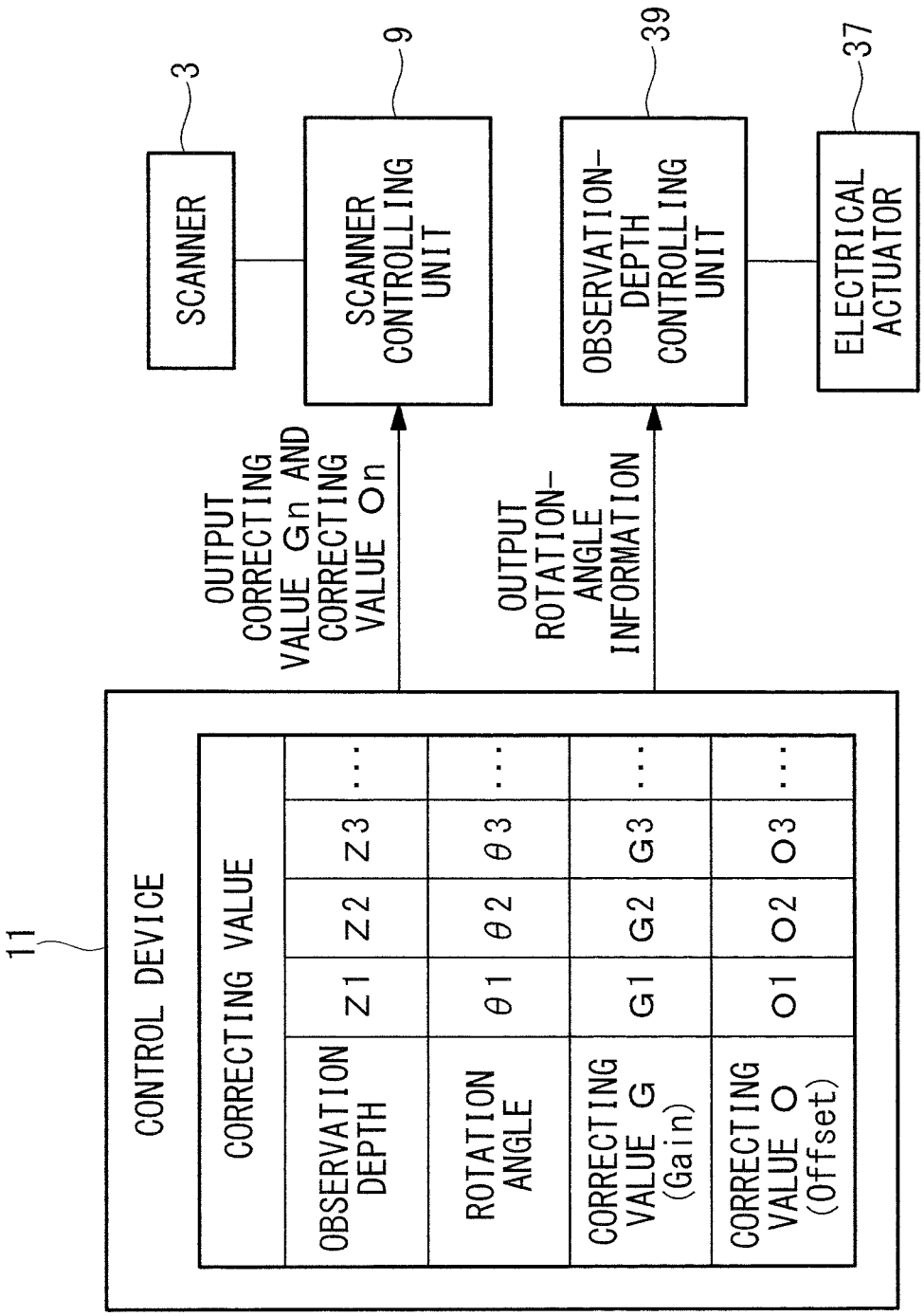
FIG. 5 is a block diagram for explaining the relationship among the control device, a scanner controlling unit, and an observation-depth controlling unit.

The observation-depth information input via the input unit 35 is sent to the control device 11. Then, as shown in FIG. 5, the control device 11 converts an observation depth Zn in the specimen S, indicated by the observation-depth information, into rotation-angle information indicating a rotation angle θn of the adjustment ring 31, and sets the corresponding number of pulses in the observation-depth controlling unit 39. Thus, the electrical actuator 37 is driven by the observation-depth controlling unit 39 on the basis of the rotation-angle information, whereby the focus is set to the observation point at the depth desired by the user.

Furthermore, the control device 11 sets the correcting value Gn and correcting value On associated with the rotation angle θn of the adjustment ring 31 indicated by the rotation-angle information in the scanner controlling unit 9. Thus, the scanner controlling unit 9 adjusts the oscillation widths and the directions of the centers of the oscillation ranges of the galvanometer mirrors 4A and 4B on the basis of the correcting value Gn and correcting value On so that the galvanometer mirrors 4A and 4B will oscillate accordingly, whereby the size and position of the observation range of the specimen S observed by the light detecting unit 7 are maintained.

Accordingly, with the laser scanning microscope 1 according to this embodiment, with the simple operation in which a user just inputs a desired observation depth, it is possible to automatically change the observation depth in the specimen so that the observation point at the desired depth can be observed precisely.

This embodiment can be modified as follows.

As a modification of this embodiment, the control device 11 may move some of the plurality of optical elements 29 in the optical-axis direction multiple times in a stepwise fashion. By moving the optical elements 29 in the optical-axis direction multiple times in a stepwise fashion, it is possible to change the focal point sequentially and to observe the specimen S along the depth direction.

In this case, for example, the control device 11 may be provided with a user interface (UI, input unit) for allowing a user to input the scanning start and end points in the X, Y and Z (depth) directions, a step size of the observation depth, etc. and a UI (input unit) for allowing a user to instruct the start of scanning.

Figure 6:
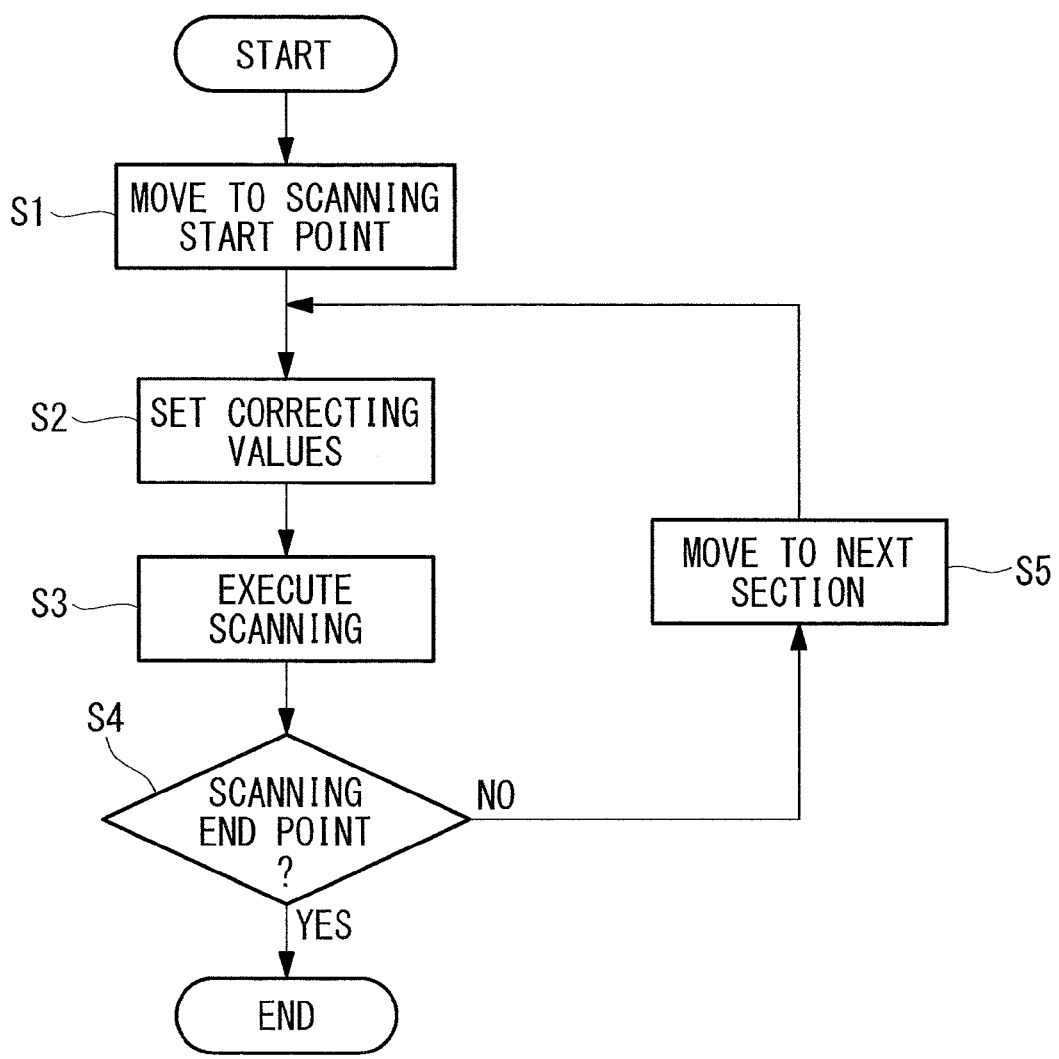
FIG. 6 is a flowchart for explaining the observation of a specimen with a laser scanning microscope according to a modification of the second embodiment of the present invention.

In the case where the specimen S is observed with the thus-configured laser scanning microscope 1, as shown in a flowchart in FIG. 6, first, a user inputs scanning start and end points and a step size of the observation depth to the control device 11 and presses a scanning start button.

The control device 11 converts the positions of the optical elements 29 corresponding to the scanning start point into rotation-angle information indicating a rotation angle of the adjustment ring 31, and the observation-depth controlling unit 39 drives the electrical actuator 37 on the basis of the rotation-angle information. Thus, the focus is set to the scanning start point (step S1).

Then, the control device 11 sets the correcting value Gn and correcting value Go associated with the rotation angle en of the adjustment ring 31 at the scanning start position in the scanner controlling unit 9 (step S2). Then, the scanner controlling unit 9 adjusts the oscillation widths and the directions of the centers of the oscillation ranges of the galvanometer mirrors 4A and 4B of the scanner 3 on the basis of the correcting value Gn and correcting value On so that the galvanometer mirrors 4A and 4B will oscillate accordingly. Thus, the laser light is scanned two-dimensionally at the scanning start point in the specimen S (step S3).

Then, the control device 11 determines whether the section of the specimen S in which the laser light is scanned corresponds to the scanning end point (step S4). If the section does not correspond to the scanning end point, the control device 11 instructs the observation-depth controlling unit 39 to rotate the adjustment ring 31 so that the optical elements 29 will be moved in the optical-axis direction by the step size of the observation depth (step S5). Then, steps S2 to S4 are repeated for the next section of the specimen S.

In this manner, until the scanning end point is reached, on the basis of the correcting value Gn and correcting value On for each observation depth, the laser light is scanned two-dimensionally at the observation point of each observation depth while adjusting the oscillation angles of the galvanometer mirrors 4A and 4B (steps S2 to S5).

When the control device 11 determines that the section of the specimen S in which the laser light is scanned has reached the scanning end point, the observation of the specimen S comes to an end.

As described above, according to this modification, each time the scanner controlling unit 9 changes the positions of the optical elements 29 of the objective lens 5 in accordance with an observation depth, the oscillation angles of the galvanometer mirrors 4A and 4B are controlled so that the observation range of the specimen S observed by the light detecting unit 7 will be maintained. This enables three-dimensional observation of a sample in a constant observation range.

[Third Embodiment]

Next, a laser scanning microscope according to a third embodiment of the present invention will be described with reference to the drawings.

A laser scanning microscope 1 according to this embodiment differs from those of the first and second embodiments in that the light source can change the wavelength of the laser light, in that the scanner controlling unit 9 controls the oscillation angles of the galvanometer mirrors 4A and 4B so that the observation range of the specimen S observed by the light detecting unit 7 will be maintained, and in that the observation-depth controlling unit (in-focus-state controlling unit) 39 controls the adjustment ring 31 so that the in-focus state of the objective lens 5 in the optical-axis direction will be maintained.

Hereinafter, parts that are configured the same as those in the laser scanning microscopes 1 according to the first and second embodiments will be designated by the same reference signs, and descriptions thereof will be omitted.

The input unit 35 allows a user to input wavelength information indicating the wavelength of the laser light that is generated from the light source, as well as observation-depth information.

In this embodiment, the correcting value G indicates the relationship between the wavelength of the laser light and the oscillation widths of the galvanometer mirrors 4A and 4B, with which the observation range becomes a predetermined range, in addition to the relationship between the rotation angle θ of the adjustment ring 31 and the oscillation widths of the galvanometer mirrors 4A and 4B. Furthermore, the correcting value O indicates the relationship between the wavelength of the laser light and the directions of the centers of the oscillation ranges of the galvanometer mirrors 4A and 4B, with which the observation range becomes a predetermined range, in addition to the relationship between the rotation angle θ of the adjustment ring 31 and the directions of the centers of the oscillation ranges of the galvanometer mirrors 4A and 4B.

Figure 7:
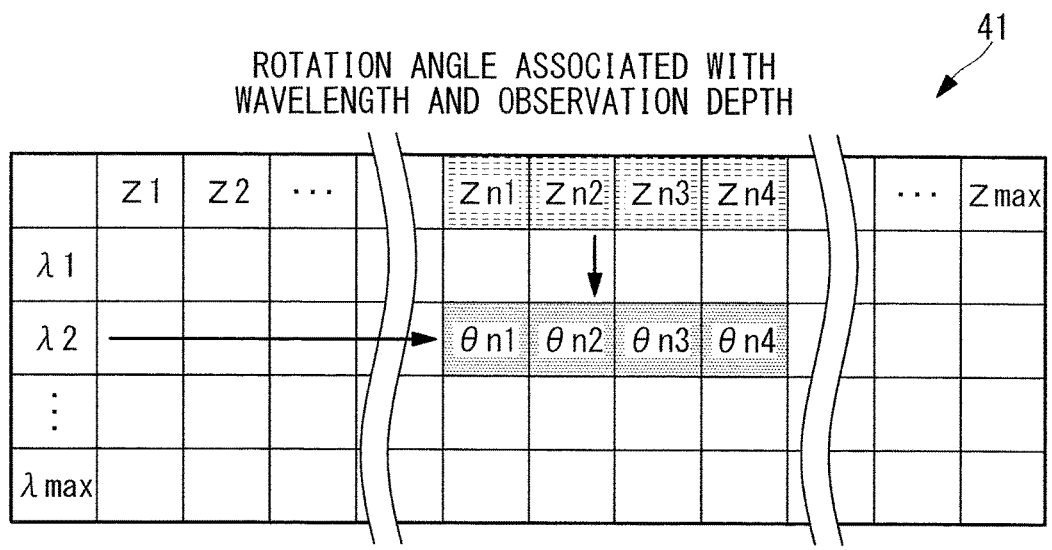
FIG. 7 is a table showing an example of rotation angles of an adjustment ring associated with laser light wavelengths and observation depths in a laser scanning microscope according to a third embodiment of the present invention.
Figure 8:
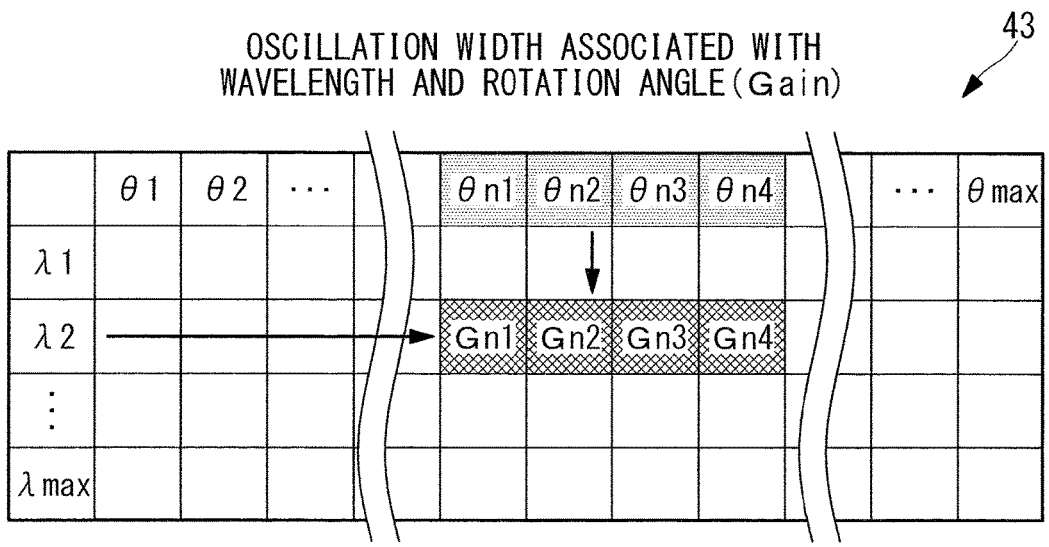
FIG. 8 is a table showing an example of oscillation widths of oscillating mirrors associated with laser light wavelengths and observation depths in the laser scanning microscope according to the third embodiment of the present invention.
Figure 9:
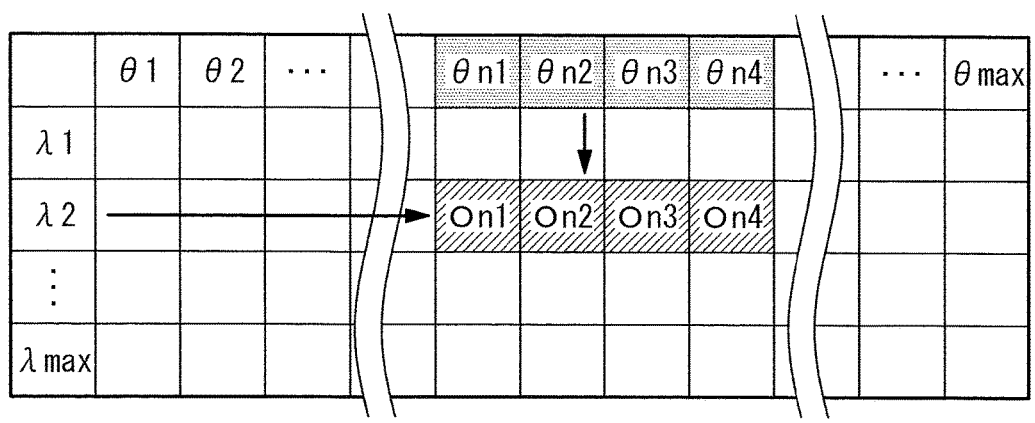
FIG. 9 is a table showing an example of the directions of the centers of oscillation ranges of the oscillating mirrors associated with laser light wavelengths and observation depths in the laser scanning microscope according to the third embodiment of the present invention.

The control device 11 stores the rotation angles θ of the adjustment ring 31, including focus correcting values indicating the relationships between the wavelengths of the laser light and the observation depths (positions of the optical elements 29) in the specimen S with which the laser light becomes focused in the optical-axis direction of the objective lens 5. In this embodiment, the control device 11 has a table 41 in which the wavelengths λ of the laser light, the observation depths Z in the specimen S, and the rotation angles θ of the adjustment ring 31 are associated with each other, as shown in FIG. 7. Furthermore, the control device 11 has a table 43 in which the wavelengths λ of the laser light, the rotation angles θ of the adjustment ring 31, and the correcting values G for the oscillation widths of the galvanometer mirrors 4A and 4B are associated with each other, as shown in FIG. 8, and also has a table 45 in which the wavelengths θ of the laser light, the rotation angles θ of the adjustment ring 31, and the correcting values O for the directions of the centers of the oscillation ranges of the galvanometer mirrors 4A and 4B are associated with each other, as shown in FIG. 9.

Figure 10:
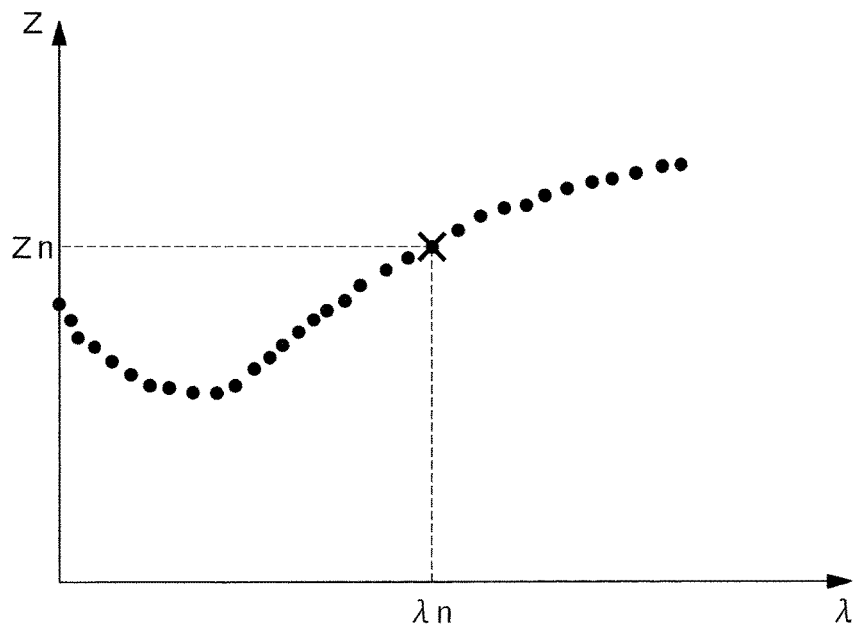
FIG. 10 is a graph showing an example of continuous measurement data of correcting values for the oscillating mirrors and rotation angles of the adjustment ring.

For the correcting values G, the correcting values O, and the rotation angles θ of the adjustment ring 31, values obtained by continuous measurement may be used, as shown in FIG. 10. In FIG. 10, the vertical axis represents the observation depth Z in the specimen, and the horizontal axis represents the wavelength λ of the laser light. This also applies to FIGS. 11 to 13.

Furthermore, the control device 11 is configured to read, from the table 41, the wavelength of the laser light indicated by the wavelength information sent from the input unit 35 and the rotation angle θ of the adjustment ring 31 corresponding to the observation depth in the specimen S indicated by the observation-depth information and to set the wavelength and the rotation angle θ in the observation-depth controlling unit 39. Furthermore, the control device 11 is configured to read, from the table 43 and the table 45, the correcting value G and the correcting value O corresponding to the wavelength of the laser light indicated by the wavelength information sent from the input unit 35 and the rotation angle θ of the adjustment ring 31 read from the table 41, respectively, and to set the correcting value G and correcting value O in the scanner controlling unit 9.

The observation-depth controlling unit 39 may be implemented by any combination of software and hardware components. For example, the observation-depth controlling unit 39 may be formed of a current-drive circuit for driving the electrical actuator 37, a memory such as a RAM for storing the rotation-angle information that is set by the controlling device 11, an interface circuit that carries out communication with the control device 11, a processor, etc. (none of these are shown). Alternatively, the observation-depth controlling unit 39 may be a computer that operates as an observation-depth controlling unit according to an observation-depth controlling program.

Now, the operation of the thus-configured laser scanning microscope 1 will be described.

In the case where the specimen S is observed with the laser scanning microscope 1 according to this embodiment, a user inputs, via the input unit 35, a wavelength of the laser light that is generated from the light source and observation-depth information indicating a desired observation depth in the specimen S.

The control device 11 reads, from the table 41 shown in FIG. 7, the rotation angle θ of the adjustment ring 31 corresponding to the wavelength λn of the laser light indicated by the wavelength information input by the user and the observation depth Z in the specimen S indicated by the observation-depth information, and sets the rotation angle θ in the observation-depth controlling unit 39. The example in FIG. 7 shows how the rotation angles θn1, θn2, θn3, and θn4 of the adjustment ring 31 corresponding to the wavelength λn of the laser light and the observation depths Zn1, Zn2, Zn3, and Zn4 are read.

Furthermore, the control device 11 reads, from the table 43 shown in FIG. 8 and the table 45 shown in FIG. 9, the correcting value Gn and correcting value On corresponding to the wavelength λn of the laser light indicated by the wavelength information input by the user and the rotation angle θn of the adjustment ring 31 read from the table 41, respectively, and sets the correcting value Gn and correcting value On in the scanner controlling unit 9. The examples in FIGS. 8 and 9 show how the correcting values Gn1, Gn2, Gn3, and Gn4 and the correcting values On1, On2, On3, and On4 corresponding to the wavelength λ2 of the laser light and the rotation angles θn1, θn2, θn3, and θn4 of the adjustment ring 31, respectively, are read.

Then, the observation-depth controlling unit 39 drives the electrical actuator 37 to rotate the adjustment ring 31 on the basis of the set rotation angle θn of the adjustment ring 31, whereby some of the plurality of optical elements 29 are moved in the optical-axis direction. Thus, in the examples in FIGS. 7 to 9, the observation depth is changed stepwise from Zn1 to Zn4.

Furthermore, on the basis of the set correcting value Gn and correcting value On, for each observation depth, the scanner controlling unit 9 adjusts the oscillation widths and the directions of the centers of the oscillation ranges of the galvanometer mirrors 4A and 4B so that the galvanometer mirrors 4A and 4B will oscillate accordingly. Thus, in the examples in FIGS. 7 to 9, at the observation depth Zn1, the oscillation widths and the directions of the centers of the oscillation ranges of the galvanometer mirrors 4A and 4B are adjusted on the basis of the correcting value Gn1 and correcting value On1 so that the galvanometer mirrors 4A and 4B will oscillate accordingly. Similarly, at the observation depth Zn2, the oscillation angles of the galvanometer mirrors 4A and 4B are adjusted on the basis of the correcting value Gn2 and correcting value On2 so that the galvanometer mirrors 4A and 4B will oscillate accordingly. At the observation depth Zn3, the oscillation angles of the galvanometer mirrors 4A and 4B are adjusted on the basis of the correcting value Gn3 and correcting value On3 so that the galvanometer mirrors 4A and 4B will oscillate accordingly. At the observation depth Zn4, the oscillation angles of the galvanometer mirrors 4A and 4B are adjusted on the basis of the correcting value Gn4 and correcting value On4 so that the galvanometer mirrors 4A and 4B will oscillate accordingly.

Here, when the wavelength of the laser light for irradiating the specimen S is changed, the focal point changes due to the effect of chromatic aberration. However, since the observation-depth controlling unit 39 adjusts the positions of the optical elements 29 on the basis of the rotation angle θn of the adjustment ring 31 including the focus correcting value corresponding to the changed wavelength λ of the laser light, it is possible to maintain a focused state by setting the focus for each observation depth (e.g., Zn1, Zn2, Zn3, and Zn4) desired by the user.

Furthermore, when the wavelength of the laser light for irradiating the specimen S is changed, chromatic aberration of magnification varies depending on the wavelength, and thus the observation range of the specimen S observed by the light detecting unit 7 varies. However, since the scanner controlling unit 9 adjusts the size and position in the direction intersecting the optical axis of the scanning range of the laser light on the basis of the correcting value G and correcting value O corresponding to the changed wavelength of the laser light, it is possible to maintain the size and position of the observation range of the specimen S observed by the light detecting unit 7 for each observation depth (e.g., Zn1, Zn2, Zn3, and Zn4).

As described above, with the laser scanning microscope 1 according to this embodiment, even in the case where the wavelength of the laser light for irradiating the specimen S is changed, it is possible to readily prevent variations in the focal point and variations in the observation range of the specimen S observed by the light detecting unit 7 due to the wavelength change.

Figure 11:
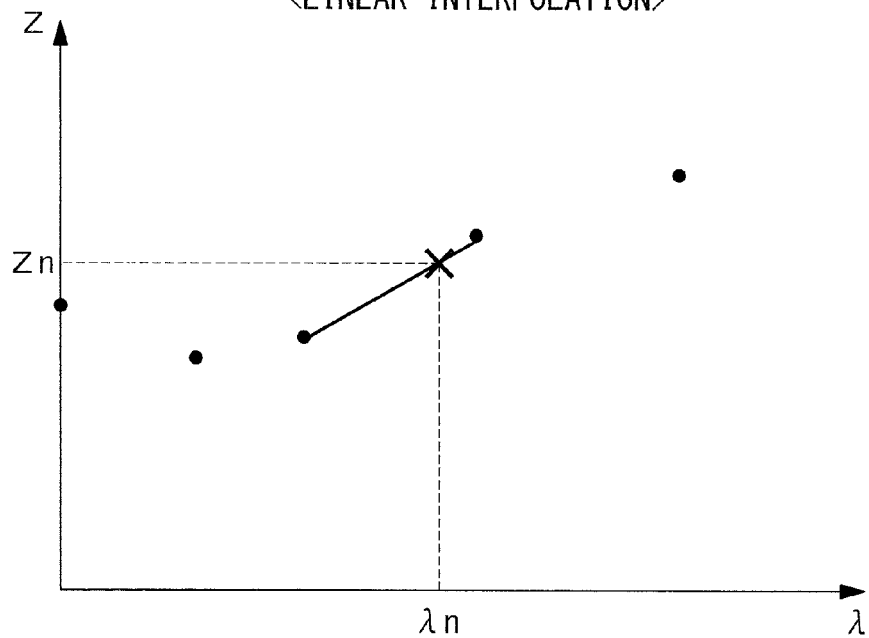
FIG. 11 is a graph showing an example of a method of linear interpolation of the correcting values for the oscillating mirrors and the rotation angles of the adjustment ring.
Figure 12:
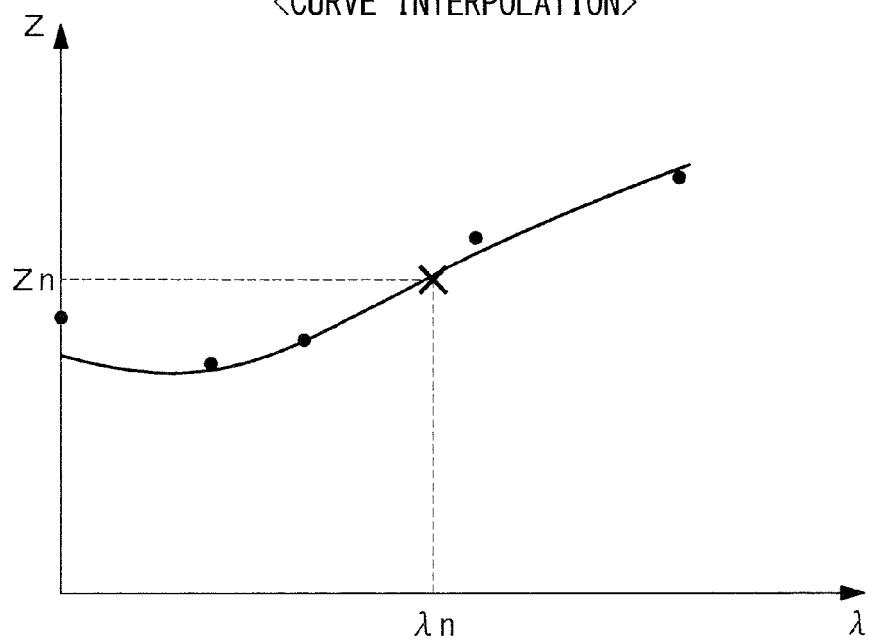
FIG. 12 is a graph showing an example of a method of curve interpolation of the correcting values for the oscillating mirrors and the rotation angles of the adjustment ring.
Figure 13:
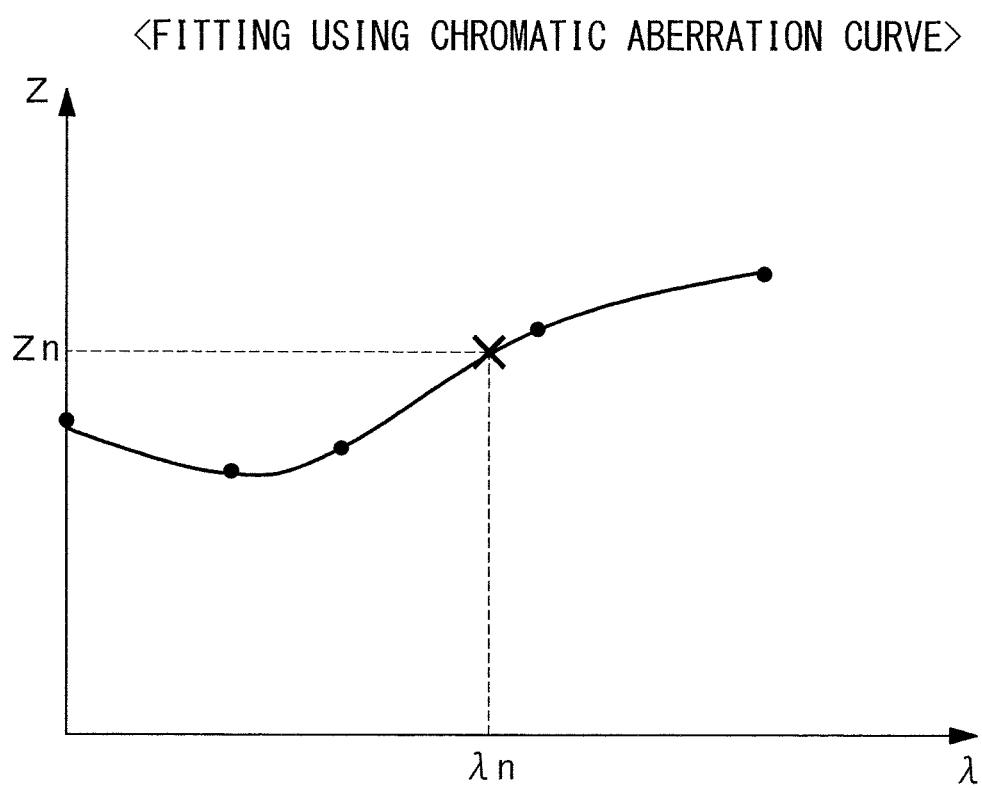
FIG. 13 is a graph showing an example of a method of fitting, using a chromatic aberration curve, of the correcting values for the oscillating mirrors and the rotation angles of the adjustment ring.

In this embodiment, values obtained by continuous measurement are used as the correcting values G, the correcting values O, and the rotation angles θ of the adjustment ring 31. Alternatively, for example, values obtained by discrete measurement may be used as the correcting values G, the correcting values O, and the rotation angles θ of the adjustment ring 31. In this case, for example, as shown in FIG. 11, a straight line may be formed by using two points corresponding to preceding and succeeding measured values, and a correcting value or rotation angle corresponding to an input value may be read from the straight line (linear interpolation). Alternatively, as shown in FIG. 12, an approximate curve may be formed, and a correcting value or rotation angle corresponding to an input value may be read from the curve (curve interpolation). Alternatively, in the case of a correcting value or rotation angle for which the parameter is the wavelength, a chromatic aberration curve may be used for fitting, as shown in FIG. 13.

Although the embodiments of the present invention have been described above in detail with reference to the drawings, specific configurations are not limited to those of the embodiments, and design modifications, etc. that do not depart from the scope of the present invention are encompassed. For example, without limitation to the above embodiments and modifications, the present invention may be applied in the form of embodiments in which these embodiments and modifications are combined as appropriate without particular limitation.

REFERENCE SIGNS LIST

1 Laser scanning microscope
3 Scanner (scanning unit)
4A, 4B Oscillating mirrors (galvanometer mirrors)
5 Objective lens (objective optical system)
9 Scanner controlling unit (oscillating-mirror controlling unit)
29 Optical elements
33 Rotation-angle detecting unit (position detecting unit)
35 Input unit
39 Observation-depth controlling unit (focal-point controlling unit, in-focus-state controlling unit)
S Specimen

The invention claimed is:

1. A laser scanning microscope comprising:
an objective optical system including (i) a plurality of optical elements that are disposed with gaps therebetween in an optical-axis direction and that condense laser light emitted from a light source onto a specimen, the plurality of optical elements being disposed inside a casing, and (ii) a focal-point changing unit that allows changing of the focal point by moving some of the plurality of optical elements in the optical-axis direction with respect to the casing;
a scanning unit that includes an oscillating mirror capable of oscillating about a predetermined oscillation axis and that scans the laser light condensed onto the specimen by the objective optical system in accordance with an oscillation angle of the oscillating mirror;
an observation optical system that obtains image information of the specimen based on return light returned from the specimen scanned by the scanning unit with the laser light; and
an oscillating-mirror controlling unit that controls the oscillation angle of the oscillating mirror so as to maintain an observation range of the specimen observed by the observation optical system based on positions of the optical elements moved by the focal-point changing unit.

2. The laser scanning microscope according to claim 1, wherein the oscillating-mirror controlling unit adjusts an oscillation width of the oscillating mirror.

3. The laser scanning microscope according to claim 1, wherein the oscillating-mirror controlling unit adjusts a direction of a center of an oscillation range of the oscillating mirror.

4. The laser scanning microscope according to claim 1, wherein the focal-point changing unit allows the optical elements to be moved in the optical-axis direction multiple times in a stepwise fashion.

5. A laser scanning microscope comprising:
an objective optical system including a plurality of optical elements that are disposed with gaps therebetween in an optical-axis direction and that condense laser light emitted from a light source onto a specimen and also including a focal-point changing unit that allows changing of the focal point by moving some of the plurality of optical elements in the optical-axis direction;
a scanning unit that includes an oscillating mirror capable of oscillating about a predetermined oscillation axis and that scans the laser light condensed onto the specimen by the objective optical system in accordance with an oscillation angle of the oscillating mirror;
an observation optical system that obtains image information of the specimen based on return light returned from the specimen scanned by the scanning unit with the laser light; and
an oscillating-mirror controlling unit that controls the oscillation angle of the oscillating mirror so as to maintain an observation range of the specimen observed by the observation optical system based on positions of the optical elements moved by the focal-point changing unit,
wherein the oscillating-mirror controlling unit controls the oscillation angle of the oscillating mirror based on an oscillation-angle correcting value indicating a relationship between positions of the optical elements and the oscillation angle of the oscillating mirror with which the observation range becomes a predetermined range.

6. The laser scanning microscope according to claim 5, further comprising a position detecting unit that detects the positions of the optical elements moved by the focal-point changing unit,
wherein the focal-point changing unit is configured to allow a user to manually move the optical elements in the optical-axis direction, and
wherein the oscillating-mirror controlling unit controls the oscillation angle of the oscillating mirror based on the oscillation-angle correcting value associated with the positions of the optical elements detected by the position detecting unit.

7. The laser scanning microscope according to claim 5, further comprising:
- an input unit that allows the user to input position information indicating the positions of the optical elements of the objective optical system; and
- a focal-point controlling unit that controls the focal-point changing unit so that the optical elements of the objective optical system come to the positions of the optical elements indicated by the position information input via the input unit, wherein the oscillating-mirror controlling unit controls the oscillation angle of the oscillating mirror based on the oscillation-angle correcting value corresponding to the positions of the optical elements indicated by the position information input via the input unit.

8. The laser scanning microscope according to claim 5, further comprising the light source, the light source being capable of changing a wavelength of the laser light that is generated, wherein the oscillating-mirror controlling unit controls the oscillation angle of the oscillating mirror so as to maintain the observation range of the specimen observed by the observation optical system based on the wavelength of the laser light emitted from the light source.

9. The laser scanning microscope according to claim 8, wherein the oscillation-angle correcting value also indicates a relationship between the wavelength of the laser light and the oscillation angle of the oscillating mirror with which the observation range becomes a predetermined range, and wherein the oscillating-mirror controlling unit controls the oscillation angle of the oscillating mirror based on the oscillation-angle correcting value corresponding to the changed wavelength of the laser light.

10. The laser scanning microscope according to claim 9, further comprising an in-focus-state controlling unit that controls the focal-point changing unit so as to maintain an in-focus state in the optical-axis direction of the objective optical system based on the wavelength of the laser light emitted from the light source.

11. The laser scanning microscope according to claim 10, wherein the in-focus-state controlling unit controls the focal-point changing unit based on a focus correcting value indicating a relationship between the wavelength of the laser light and the positions of the optical elements with which the laser light becomes focused in the optical-axis direction of the objective optical system.

\* \* \* \* \*